US008683251B2

(12) United States Patent
Archibald et al.

(10) Patent No.: US 8,683,251 B2
(45) Date of Patent: Mar. 25, 2014

(54) DETERMINING REDUNDANCY OF POWER FEEDS CONNECTING A SERVER TO A POWER SUPPLY

(75) Inventors: Matthew R. Archibald, Morrisville, NC (US); Jerrod K. Buterbaugh, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/905,142

(22) Filed: Oct. 15, 2010

(65) Prior Publication Data
US 2012/0096297 A1    Apr. 19, 2012

(51) Int. Cl.
*G06F 1/00* (2006.01)
*H02H 3/00* (2006.01)
*H02M 1/00* (2007.01)

(52) U.S. Cl.
USPC .............................. 713/340; 307/340; 361/64

(58) Field of Classification Search
USPC ................................ 361/64; 307/29; 713/340
See application file for complete search history.

(56) References Cited

U.S. PATENT DOCUMENTS

| 5,747,889 | A | 5/1998 | Raynham et al. |
| 6,483,709 | B1 | 11/2002 | Layton |
| 6,943,683 | B2 | 9/2005 | Perret |
| 7,131,019 | B2 * | 10/2006 | Lee ................................ 713/340 |
| 7,187,177 | B2 * | 3/2007 | Kelly et al. ..................... 324/424 |
| 7,191,894 | B2 * | 3/2007 | Costanzo et al. ......... 198/457.05 |
| 7,242,764 | B2 * | 7/2007 | Miyamoto ..................... 379/413 |
| 7,333,000 | B2 | 2/2008 | Vassallo |
| 7,433,763 | B2 * | 10/2008 | Culley .......................... 700/295 |
| 7,436,950 | B2 | 10/2008 | Chheda et al. |
| 7,493,503 | B2 * | 2/2009 | Alderegiua et al. ........... 713/300 |
| 7,549,002 | B2 | 6/2009 | Gasser et al. |

(Continued)

FOREIGN PATENT DOCUMENTS

| JP | 2009-75948 | 4/2009 |
| JP | 2009-217721 | 9/2009 |

(Continued)

OTHER PUBLICATIONS

HP Support, Best Practices for Power Suppy Configuration in the Proliant DL580 G5 Server, Sep. 9, 2008.*

(Continued)

*Primary Examiner* — Paul R Myers
*Assistant Examiner* — Christopher a Daley
(74) *Attorney, Agent, or Firm* — Brandon C. Kennedy; Katherine S. Brown; Biggers Kennedy Lenart Spraggins LLP

(57) ABSTRACT

Methods, system, and computer program products are provided for determining redundancy of power feeds connecting a server to a power supply. Embodiments include receiving, by a redundancy monitoring manager, from each of a plurality of redundancy monitoring interposers, connection information, wherein each redundancy monitoring interposer comprises a device that provides an electrical contact between a power circuit and one of a power supply, the server, and another power circuit; in dependence upon the connection information, determining, by the redundancy monitoring manager, for each power feed provided to the server, which power circuits supply the power feed; determining, by the redundancy monitoring manager, if any of the power feeds are supplied by the same power circuit; and indicating, by the redundancy monitoring manager, that the server has at least one non-redundant power feed when multiple power feeds of the server are supplied by the same power circuit.

9 Claims, 5 Drawing Sheets

(56) References Cited

U.S. PATENT DOCUMENTS

| | | | |
|---|---|---|---|
| 7,793,115 B2* | 9/2010 | Tipley et al. | 713/300 |
| 2002/0066045 A1 | 5/2002 | Layton et al. | |
| 2005/0022043 A1* | 1/2005 | Yamaji et al. | 713/340 |
| 2006/0282685 A1* | 12/2006 | Bahali et al. | 713/300 |
| 2007/0103835 A1* | 5/2007 | Sorenson | 361/114 |
| 2008/0062003 A1 | 3/2008 | Paetz | |
| 2008/0120043 A1* | 5/2008 | Miller et al. | 702/24 |
| 2008/0126292 A1 | 5/2008 | Bhogal | |
| 2009/0175195 A1 | 7/2009 | Macauley | |
| 2009/0179119 A1 | 7/2009 | Wallingford et al. | |
| 2009/0228726 A1 | 9/2009 | Malik et al. | |
| 2009/0273334 A1 | 11/2009 | Holovacs et al. | |
| 2009/0289809 A1* | 11/2009 | Gray et al. | 340/870.11 |
| 2011/0025129 A1 | 2/2011 | Humphrey et al. | |
| 2011/0320827 A1 | 12/2011 | Siegman et al. | |
| 2012/0036387 A1 | 2/2012 | Nakashima et al. | |
| 2012/0072754 A1 | 3/2012 | Doblar et al. | |
| 2012/0092811 A1* | 4/2012 | Chapel et al. | 361/622 |
| 2012/0096297 A1 | 4/2012 | Archibald et al. | |
| 2012/0239958 A1 | 9/2012 | Archibald et al. | |

FOREIGN PATENT DOCUMENTS

| | | |
|---|---|---|
| KR | 1997-0056902 | 7/1997 |
| KR | 2002-0091057 | 12/2002 |
| KR | 10-0496116 | 6/2005 |
| KR | 2006066458 A | 6/2006 |
| KR | 10-2007-0037427 | 4/2007 |
| KR | 10-2007-0083772 | 8/2007 |
| KR | 10-2008-0047792 | 5/2008 |

OTHER PUBLICATIONS

Piotr Mazur et al , Redundant Monitoring and Control System for Large Server Farms, Feb. 19, 2008.*

HP Support, HP Insight Control power management User Guide, Jan. 2010.*

Office Action, U.S. Appl. No. 13/487,490, Sep. 10, 2012, pp. 1-08.

Notice of Allowance, U.S. Appl. No. 13/487,490, Mar. 26, 2013, pp. 1-06.

\* cited by examiner

DETERMINING REDUNDANCY OF POWER FEEDS CONNECTING A SERVER TO A POWER SUPPLY

BACKGROUND OF THE INVENTION

1. Field of the Invention

The field of the invention is data processing, or, more specifically, methods, apparatus, and products for determining redundancy of power feeds connecting a server to a power supply.

2. Description of Related Art

A typical data center may utilize a large number of electrical line cords to connect devices to other electrical cords or to other devices. These cords often become tangled with one another and therefore the ability of a system administrator to identify which power cord is connected to which power circuit may be reduced. As such, often multiple power feeds of a server are connected to the same power circuit. As a result, the server is not actually provided with redundant power when the shared power circuit fails.

SUMMARY OF THE INVENTION

Methods, systems, and computer program products are provided for determining redundancy of power feeds connecting a server to a power supply. Embodiments include receiving, by a redundancy monitoring manager, from each of a plurality of redundancy monitoring interposers, connection information, wherein each redundancy monitoring interposer comprises a device that provides an electrical contact between a power circuit and one of a power supply, the server, and another power circuit; in dependence upon the connection information, determining, by the redundancy monitoring manager, for each power feed provided to the server, which power circuits supply the power feed; determining, by the redundancy monitoring manager, if any of the power feeds are supplied by the same power circuit; and indicating, by the redundancy monitoring manager, that the server has at least one non-redundant power feed when multiple power feeds of the server are supplied by the same power circuit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
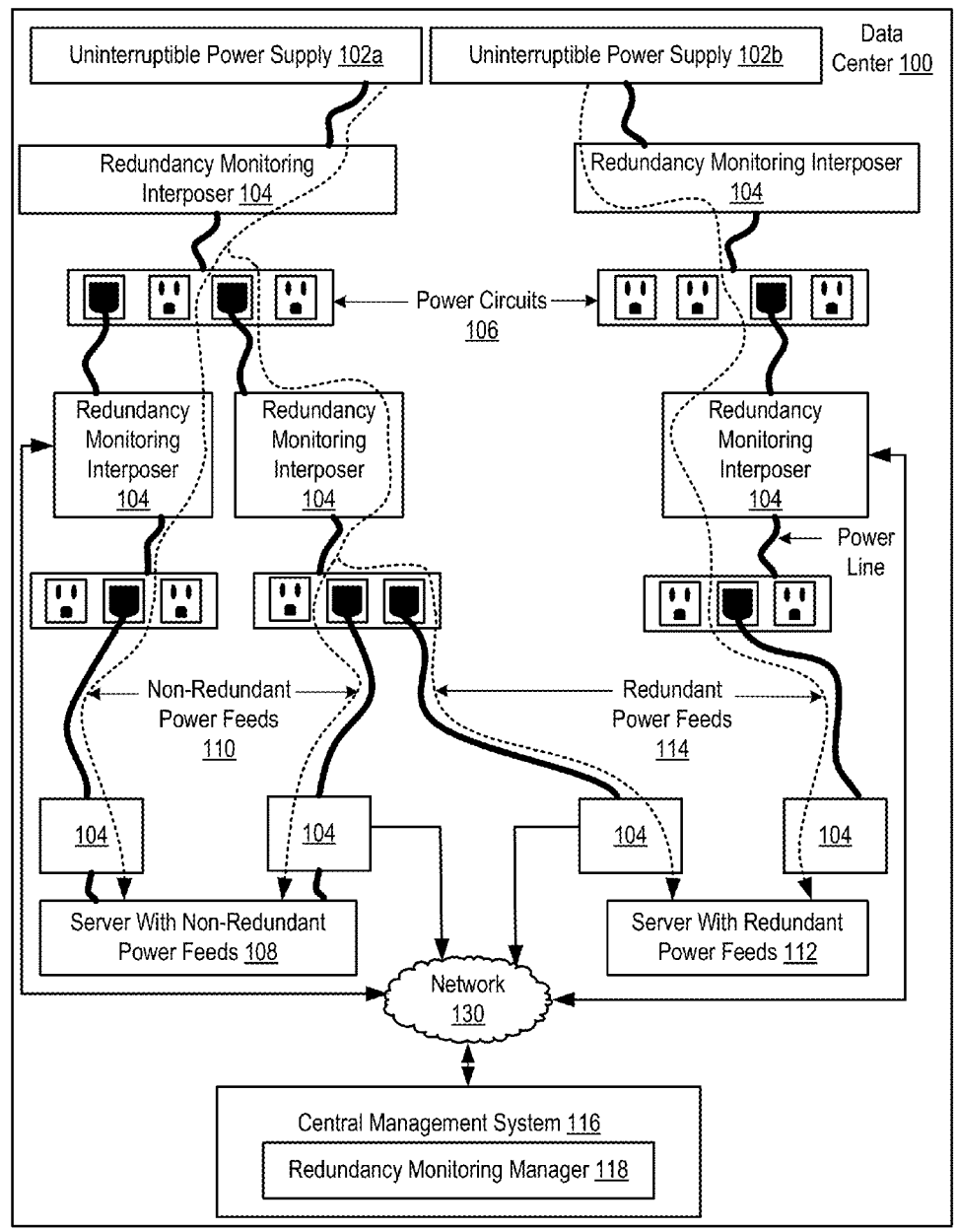
FIG. 1 sets forth a network diagram of a system for determining redundancy of power feeds connecting a server to a power supply according to embodiments of the present invention.

Exemplary methods, systems, and products for determining redundancy of power feeds connecting a server to a power supply in accordance with the present invention are described with reference to the accompanying drawings, beginning with FIG. 1. FIG. 1 sets forth a network diagram of a system for determining redundancy of power feeds connecting a server to a power supply according to embodiments of the present invention. The system of FIG. 1 includes a data center (100). A data center is a centralized repository, either physical or virtual, for the storage, management, and dissemination of data and information typically organized around a particular subject or pertaining to a particular business. A data center may exist within an organization's facilities or may be maintained as a specialized facility. Data centers vary in size from buildings of servers to server rooms to even computer closets.

The data center (100) of FIG. 1 includes a plurality of servers (108, 112) that are connected to uninterruptible power supplies (102a, 102b) through power circuits (106). An uninterruptible power supply is a device or system that continuously supplies electrical or other types of energy. The power circuits (106) of FIG. 1 may be power distribution units (PDU), such as an inter-rack power PDU or a raised floor PDU. A power distribution unit is a device that distributes electric power. Large industrial power distribution units are used for taking high voltage and current and reducing it to more common and useful levels, for example from 240V 30 A single phase to multiple 120V 15 A or 120V 20 A plugs. A power distribution unit may have features like remote power monitoring, control down to the individual plug level, environmental monitoring, or a webcam USB port.

Each server (108, 112) of FIG. 1 is connected to at least one of the uninterruptible power supplies (102a, 102b) through power feeds. Those of skill in the art will appreciate that the uninterruptible power supplies (102a, 10b) may be further connected to other uninterruptible power supplies to create additional redundancy. A power feed as this term is used in this specification is an electrical path through devices and power lines supplying power to a server from a power supply. When the power feeds of a server are comprised of distinct power lines and power circuits, the power feeds of the server are redundant. That is, the power feeds of a server are redundant if none of the power feeds include the same power lines and power circuits. The data center (100) of FIG. 1 includes a server (108) with non-redundant power feeds (110) and a server (112) with redundant power feeds (114). The non-redundant power feeds (110) each have one power circuit that is shared by both power feeds (110). That is, the server (108) with non-redundant power feeds (110) receives power from the same power circuit (106). The redundant power feeds (114) do not have any shared components. That is, power is supplied from each of the uninterruptible power supplies (102a, 102b) to the server (112) through two distinct power feeds.

Redundancy monitoring interposers (104) of FIG. 1 are connected to the power lines of the servers (108, 112), the power circuits (104), and the uninterruptible power supplies (102a, 102b) to determine which power feeds of a server are redundant. A redundancy monitoring interposer (104) is a device that provides an electrical contact between power lines of servers, power circuits, and power supplies. Each redundancy monitoring interposer (104) is capable of generating connection information for identifying one or more of the devices, such as power circuits (106), servers (108, 112), and uninterruptible power supplies (102a, 102b), that are coupled to the redundancy monitoring interposer (104). The redundancy monitoring interposers (104) of FIG. 1 may include circuit logic for carrying out the calculation of the connection information or the calculations may be carried out in a software module in RAM within the redundancy monitoring interposer (104). The redundancy monitoring interposer (104) is also capable of transmitting the connection information to other devices, such as the servers (108, 112), the central management system (116), and other redundancy monitoring interposers (104).

The data center (100) of FIG. 1 includes a redundancy monitoring manager (118) for determining redundancy of power feeds connecting a server to a power supply. The redundancy monitoring manager (118) includes computer program instructions that when executed cause a processor to carry out the steps of: receiving, by a redundancy monitoring manager, from each of a plurality of redundancy monitoring interposers, connection information, wherein each redundancy monitoring interposer comprises a device that provides an electrical contact between a power circuit and one of a power supply, the server, and another power circuit; in dependence upon the connection information, determining, by the redundancy monitoring manager, for each power feed provided to the server, which power circuits supply the power feed; determining, by the redundancy monitoring manager, if any of the power feeds are supplied by the same power circuit; and indicating, by the redundancy monitoring manager, that the server has at least one non-redundant power feed when multiple power feeds of the server are supplied by the same power circuit. The redundancy monitoring manager (118) in the example of FIG. 1 is installed upon the central management system (116). In alternative embodiments, the redundancy monitoring manager (118) may be integrated into one or more other devices of the data center (100), such as a redundancy monitoring interposer (104) or a server (112).

By identifying if a particular server includes non-redundant power feeds, a system administrator may reconnect the power lines of the particular server to different power circuits such that the particular server includes non-redundant power feeds, thus preventing power supply problems in the event of a single power circuit failure or a single uninterruptible power failure. If a system administrator is presented with an identification of a redundancy issue instead of manually checking the connections, the workload of the system administrator at the data center (100) is reduced.

Communication between the redundancy monitoring interposers (104), the redundancy monitoring manager (118), the servers (108, 112), the uninterruptible power supplies 9102a, 102b) and the central management system (116) of FIG. 1 may be facilitated through a local area network (130). The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Determining redundancy of power feeds connecting a server to a power supply in accordance with the present invention is generally implemented with computers, that is, with automated computing machinery. For further explanation, therefore, FIG. 2 sets forth a block diagram of automated computing machinery comprising an exemplary central management system (116) useful in determining redundancy of power feeds connecting a server to a power supply according to embodiments of the present invention. The central management system (116) of FIG. 2 includes at least one computer processor (156) or 'CPU' as well as random access memory (168) ('RAM') which is connected through a high speed memory bus (166) and bus adapter (158) to the processor (156) and to other components of the central management system (116).

Stored in RAM (168) is a redundancy monitoring manager (118) that includes computer program instructions for determining redundancy of power feeds connecting a server to a power supply according to embodiments of the present invention. The redundancy monitoring manager (118) includes computer program instructions that when executed by the processor (156), cause the central management system (116) to receive from each of a plurality of redundancy monitoring interposers, connection information; in dependence upon the connection information, determine for each power feed provided to the server, which power circuits supply the power feed; determine if any of the power feeds are supplied by the same power circuit; and indicate that the server has at least one non-redundant power feed when multiple power feeds of the server are supplied by the same power circuit.

Also stored in RAM (168) is an operating system (154). Operating systems useful in determining redundancy of power feeds connecting a server to a power supply according to embodiments of the present invention include UNIX™, Linux™, Microsoft XP™, AIX™, IBM's i5/OS™, and others as will occur to those of skill in the art. The operating system (154) and the redundancy monitoring manager (118) in the example of FIG. 2 are shown in RAM (168), but many components of such software typically are stored in non-volatile memory also, such as, for example, on a disk drive (not shown).

Figure 2:
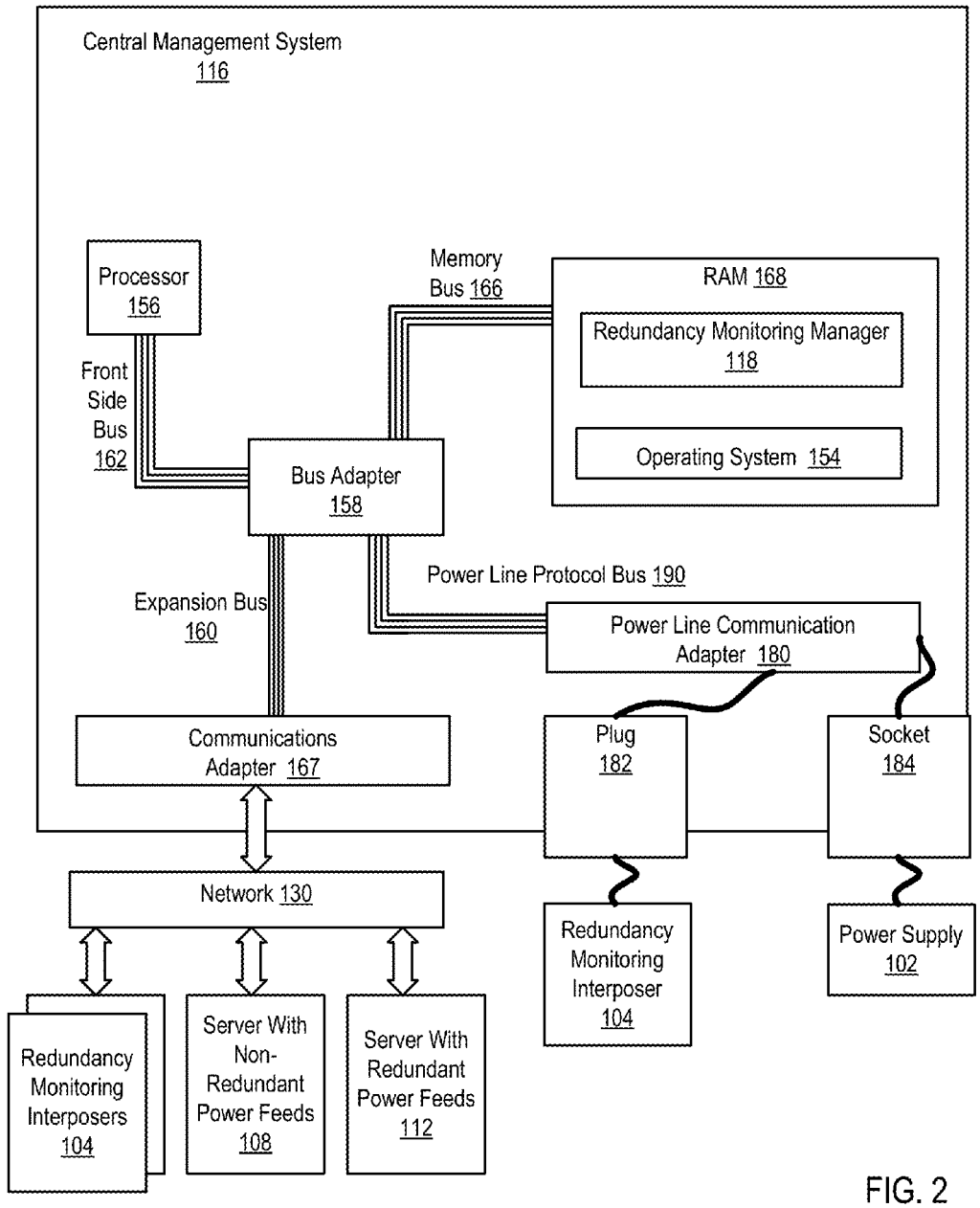
FIG. 2 sets forth a block diagram of automated computing machinery comprising an exemplary central management system useful in determining redundancy of power feeds connecting a server to a power supply according to embodiments of the present invention.

The central management system (116) of FIG. 2 includes a power line communication adapter (180) that is coupled to a plug (182) and a socket (184). The power line communication adapter (180) is coupled to the power line of the power circuit (108) between the plug (182) and the socket (184). The power line communication adapter (180) of FIG. 2 is used to send and receive data communication through the power line of the redundancy monitoring interposer (108) and send and receive the data communication to the other components of the power supply (102) over the power line protocol bus (190). Data communications may include connection information that indicates which devices are connected to which redundancy monitoring interposers (104). The redundancy monitoring interposers (104), the central management system (116), and the servers (108, 112) of FIG. 2 may communicate by a power line communication protocol. In power line communication protocols, the power line is used to transmit data communications from one device to another.

Examples of power line communications protocols useful for determining redundancy of power feeds connecting a server to a power supply according to embodiments of the present invention include X10, KNX, INSTEON, BACnet, LonWorks, and HomePlug specifications. The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomePlug protocol uses Orthogonal Frequency Division Multiplexing (OFDM) to split the RF signal into multiple smaller sub-signals that are then transmitted from one HomePlug enabled-device to another HomePlug-enabled device at different frequencies across the powerline.

The exemplary central management system (116) of FIG. 2 includes a communications adapter (167) for data communications with a network (130). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for determining redundancy of power feeds connecting a server to a power supply according to embodiments of the present invention include modems for wired dial-up communications, Ethernet (IEEE 802.3) adapters for wired data communications network communications, and 802.11 adapters for wireless data communications network communications.

Figure 3:
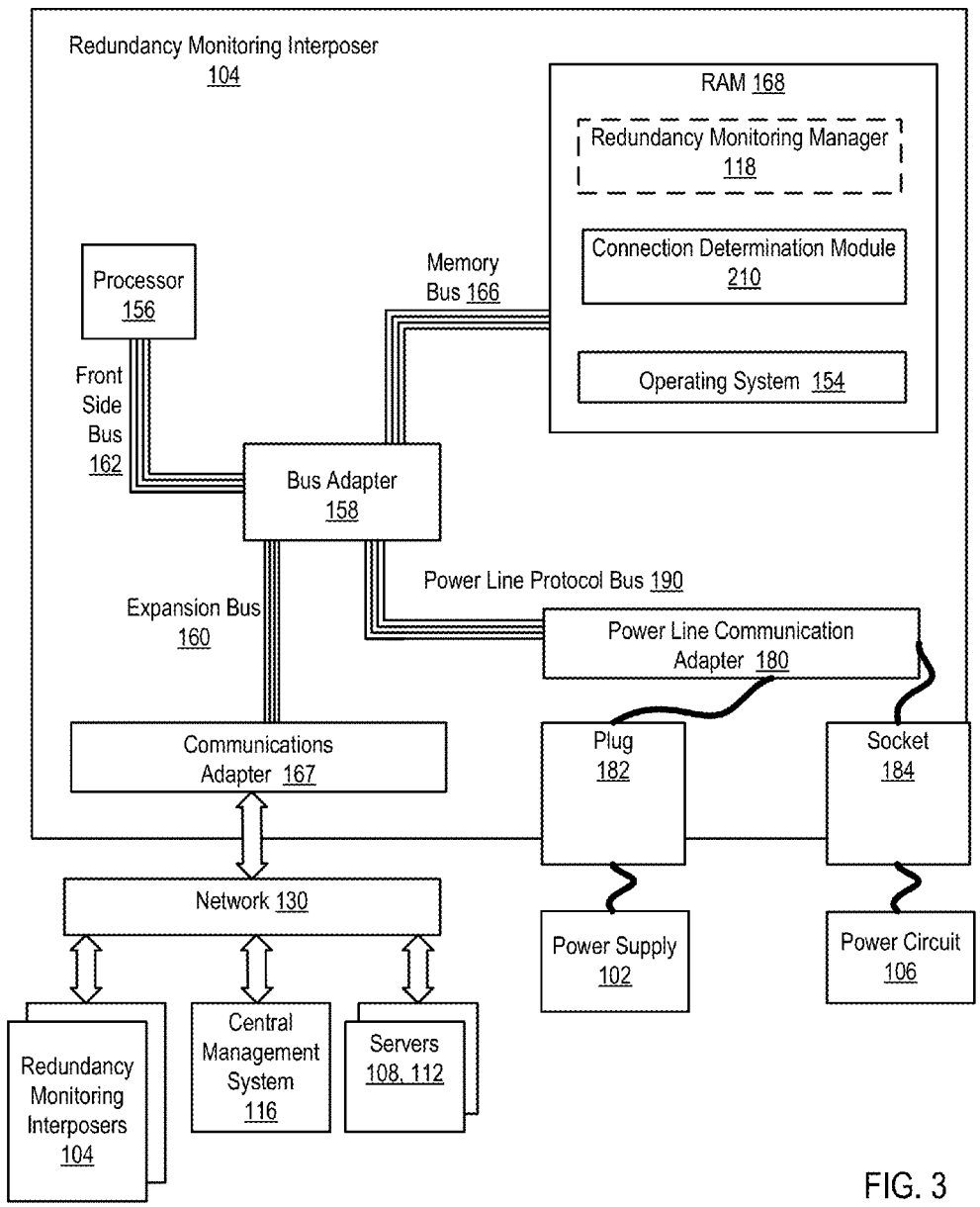
FIG. 3 sets forth a block diagram of automated computing machinery comprising an exemplary redundancy power monitoring interposer useful in determining redundancy of power feeds connecting a server to a power supply according to embodiments of the present invention.

For further explanation, therefore, FIG. 3 sets forth a block diagram of automated computing machinery comprising an exemplary redundancy power monitoring interposer useful in determining redundancy of power feeds connecting a server to a power supply according to embodiments of the present invention. The exemplary redundancy monitoring interposer (104) of FIG. 3 includes many of the components of the central management system (116) of FIG. 2. That is, the redundancy monitoring interposer (104) of FIG. 3 includes a processor (156), a bus adapter (158), a front side bus (162), a memory bus (166), a power line protocol bus (190), a power line communication adapter (180), a communications adapter (167), a plug (182), a socket (184), and expansion bus (160), a RAM (168), a redundancy monitoring manager (118), and an operation system (154). The redundancy monitoring interposer (104) also includes a connection determination module (210).

The redundancy monitoring manager is stored in RAM (168) and includes computer program instructions for determining redundancy of power feeds connecting a server to a power supply according to embodiments of the present invention. In addition to the computer program instructions discussed in FIG. 2 as included in the redundancy monitoring interposers (104), the connection determination module (210) of FIG. 3 includes computer program instructions that when executed by the processor (156), cause the redundancy monitoring interposer (104) to: determine an identification of a device that is connected to the plug (182), determine an identification of a device that is connected to the socket (184), transmit the identifications of the device that are connected to the redundancy monitoring interposer to the central management system (116), the servers (108, 112), and the redundancy monitoring interposer (104). Determining the identification of the devices connected to the redundancy monitoring interposer may include transmitting and receiving information between the devices and the redundancy monitoring interposer (104). The redundancy monitoring interposer (104) of FIG. 3 uses the communications adapter (167) to transmit data communications, such as connection information through the network (130) to the central management system (116), another redundancy monitoring interposer (104), or the servers (112). The redundancy monitoring interposer (104) of FIG. 3 also uses the power line communication adapter (180) to transmit the data communications through the power line of the power supply (102) and the power circuit (106).

Figure 4:
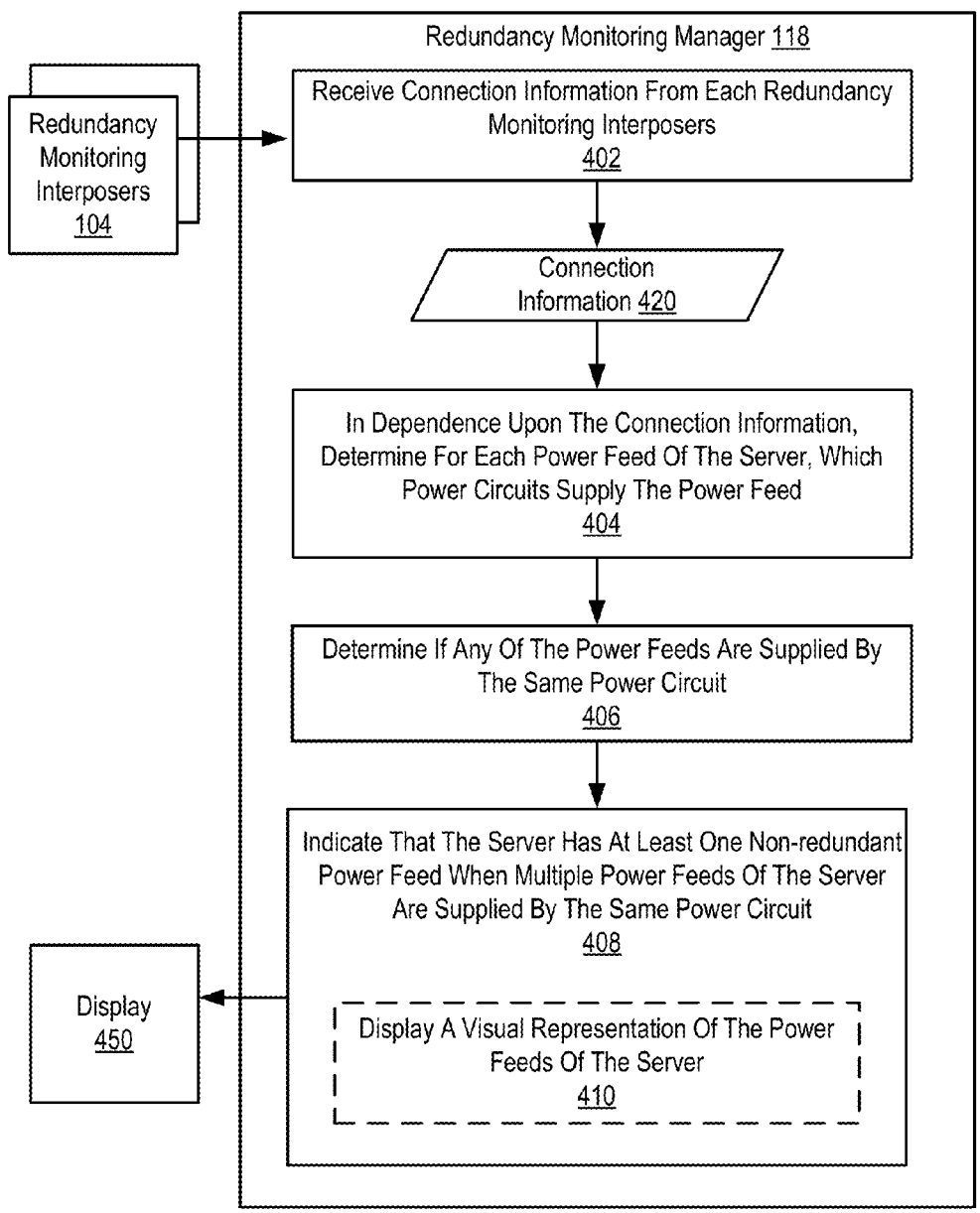
FIG. 4 sets forth a flowchart illustrating an exemplary method for determining redundancy of power feeds connecting a server to a power supply according to embodiments of the present invention.

For further explanation, FIG. 4 sets forth a flowchart illustrating an exemplary method for determining redundancy of power feeds connecting a server to a power supply according to embodiments of the present invention. The method of FIG. 4 includes receiving (402), by a redundancy monitoring manager (118), from each of a plurality of redundancy monitoring interposers (104), connection information (420). The connection information (420) of FIG. 4 may include an identification of one or more devices connected to the redundancy monitoring interposer (104). Receiving (402) the connection information (420) may be carried out by establishing, by the redundancy monitoring manager (118), a connection with the redundancy monitoring interposer (104), transmitting a request for the connection information (420), storing the received connection information (420), correlating the received connection information (420) with a particular redundancy monitoring interposer (104).

The method of FIG. 4 includes in dependence upon the connection information (420), determining (404), by the redundancy monitoring manager (118), for each power feed of the server, which power circuits supply the power feed. Determining (404) which power circuits supply the power feed may be carried out by grouping identifications of redundancy monitoring interposers (104) that have the same identifications of device connections; in dependence upon the group, determining which redundancy monitoring interposers are in the feed; and generating for each power feed, a list of identifications of power circuits corresponding to the power feed.

The method of FIG. 4 includes determining (406), by the redundancy monitoring manager (118), if any of the power feeds are supplied by the same power circuit. Determining (406) if any of the power feeds are supplied by the same power circuit may be carried out by retrieving the lists of identifications of power circuits corresponding to the power feeds; comparing the identifications of power circuits associated with a power feed with another power feed; and tracking which device identifications of a power feed match other device identifications of another power feed.

The method of FIG. 4 includes indicating (408), by the redundancy monitoring manager (118), that the server has at least one non-redundant power feed when multiple power feeds of the server are supplied by the same power circuit. Indicating (408) that the server has at least one non-redundant power feed may be carried out by displaying a visual representation of the power feeds for the server on a display (450), identifying within the visual representation, power feeds that are non-redundant, and suggesting an arrangement of connections that will result in a server having redundant power feeds. Suggesting an arrangement of connections may include identifying a plurality of potential arrangements of connections between a server and power circuits, determining which potential arrangements will result in redundant power feeds supplying the server, and presenting to a user at least one of those arrangements resulting in redundant power feeds.

Figure 5:
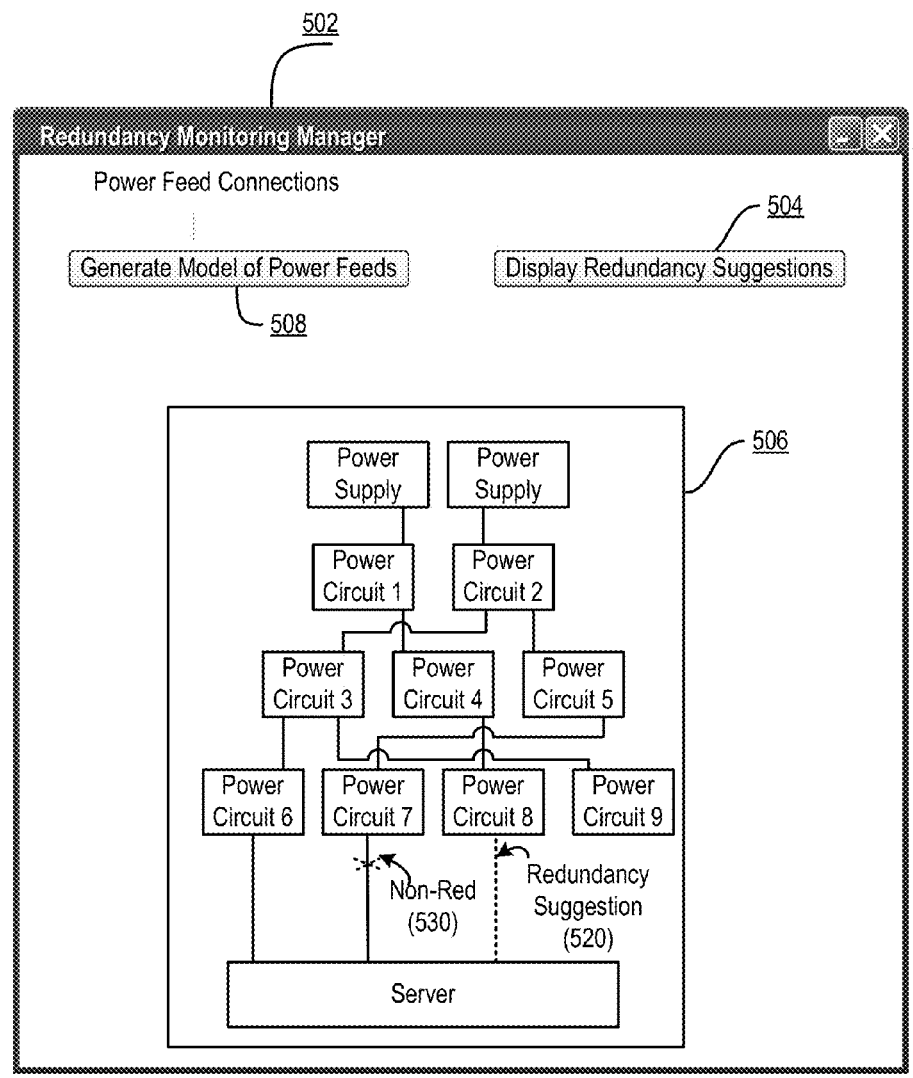
FIG. 5 sets forth a graphical user interface of a redundancy monitoring manager for determining redundancy of power feeds connecting a server to a power supply according to embodiments of the present invention.

For further explanation, FIG. 5 sets forth a graphical user interface of a redundancy monitoring manager for determining redundancy of power feeds connecting a server to a power supply according to embodiments of the present invention. The graphical user interface (GUI) (502) is an application window that presents a user of the redundancy monitoring manager (118) of FIG. 4 with a button (508) to generate a model (506) and a button (504) to display redundancy suggestions. In response to a user clicking the generate model button (508), the redundancy monitoring manager (118) models the power feeds for a server based on connection information received from redundancy monitoring interposers. In response to a user clicking the display redundancy suggestions button (504), the redundancy monitoring manager displays a suggested connection (520) to a power circuit that would result in redundant power feeds for a server. Suggesting a connection (520) may include the redundancy monitoring manager identifying one or more arrangements of connections between the server and the power circuits that will result in redundant power feeds. As part of suggesting an arrangement to produce redundant power feeds, the redundancy monitoring manager displays an indication of which connections between the server and the power circuits should be terminated and also displays which connections between the server and the power circuits should be connected. In the example of FIG. 5, the connections (530) that should be terminated are indicated with an "x" and the connections (520) that redundancy monitoring manager suggests are indicated with a dashed line. The features, buttons, and functions of the GUI (502) are for illustration. A GUI of the redundancy monitoring manager may include other buttons, features, and functions useful for determining redundancy of power feeds connecting a server to a power supply according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for determining redundancy of power feeds connecting a server to a power supply, the system comprising:
   a redundancy monitoring manager to:
   receive from each of a plurality of redundancy monitoring interposers, connection information, wherein each redundancy monitoring interposer comprises a device that provides an electrical contact between a power circuit and one of a power supply, the server, and another power circuit; wherein the connection information is received wirelessly from the redundancy monitoring interposers;
   in dependence upon the connection information, determine for each power feed provided to the server, which power circuits supply the power feed;
   determine if any of the power feeds are supplied by the same power circuit; and
   indicate that the server has at least one non-redundant power feed when multiple power feeds of the server are supplied by the same power circuit.

2. The system of claim 1, wherein the connection information received from a particular redundancy monitoring interposer identifies the power circuits that are connected to the particular redundancy monitoring interposer.

3. The system of claim 1, wherein at least one redundancy power interposer determines the connection information by communicating with one of a power circuit, the server, and another redundancy power interposer.

4. The system of claim 1, wherein indicating that the server has at least one non-redundant power feed includes displaying a visual representation of the power feeds for the server, wherein the visual representation indicates the non-redundant power feeds and the redundant power feeds.

5. The system of claim 1, wherein the redundancy monitoring manager is integrated within one of the redundancy monitoring interposers.

6. A computer program product for determining redundancy of power feeds connecting a server to a power supply, the computer program product disposed upon a computer readable medium, the computer program product comprising computer program instructions that when executed by a computer cause the computer to carry out the steps of:
   receiving, by a redundancy monitoring manager, from each of a plurality of redundancy monitoring interposers, connection information, wherein each redundancy monitoring interposer comprises a device that provides an electrical contact between a power circuit and one of a power supply, the server, and another power circuit; wherein the connection information is received wirelessly from the redundancy monitoring interposers;
   in dependence upon the connection information, determining, by the redundancy monitoring manager, for each power feed provided to the server, which power circuits supply the power feed;
   determining, by the redundancy monitoring manager, if any of the power feeds are supplied by the same power circuit; and
   indicating, by the redundancy monitoring manager, that the server has at least one non-redundant power feed when multiple power feeds of the server are supplied by the same power circuit.

7. The computer program product of claim 6, wherein the connection information received from a particular redundancy monitoring interposer identifies the power circuits that are connected to the particular redundancy monitoring interposer.

8. The computer program product of claim 6, wherein at least one redundancy power interposer determines the connection information by communicating with one of a power circuit, the server, and another redundancy power interposer.

9. The computer program product of claim 6, wherein indicating that the server has at least one non-redundant power feed includes displaying a visual representation of the power feeds for the server, wherein the visual representation indicates the non-redundant power feeds and the redundant power feeds.

* * * * *